(12) United States Patent
Riera et al.

(10) Patent No.: US 11,220,326 B2
(45) Date of Patent: Jan. 11, 2022

(54) PART AND METHOD FOR PRODUCING A PART HAVING REDUCED DRAG BY NON-CONSTANT RIBLETS

(71) Applicant: SAFRAN AIRCRAFT ENGINES, Paris (FR)

(72) Inventors: William Henri Joseph Riera, Moissy-Cramayel (FR); Jerome Jean-Yves Talbotec, Moissy-Cramayel (FR); Julien Roger Marcel Marty, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 579 days.

(21) Appl. No.: 16/313,722

(22) PCT Filed: Jun. 27, 2017

(86) PCT No.: PCT/FR2017/051721
§ 371 (c)(1),
(2) Date: Dec. 27, 2018

(87) PCT Pub. No.: WO2018/002514
PCT Pub. Date: Jan. 4, 2018

(65) Prior Publication Data
US 2019/0168862 A1 Jun. 6, 2019

(30) Foreign Application Priority Data
Jun. 28, 2016 (FR) ........................................ 1656025

(51) Int. Cl.
*B64C 21/10* (2006.01)
*F01D 5/14* (2006.01)
(Continued)

(52) U.S. Cl.
CPC .............. *B64C 21/10* (2013.01); *F01D 5/145* (2013.01); *F01D 5/147* (2013.01); *F01D 9/041* (2013.01);
(Continued)

(58) Field of Classification Search
CPC ..... B64C 21/10; B64C 2230/26; F01D 5/145; F01D 5/147; F01D 25/162; F01D 9/041;
(Continued)

(56) References Cited

U.S. PATENT DOCUMENTS 4,930,729 A * 6/1990 Savill ...................... B64C 21/10
244/200
5,133,519 A * 7/1992 Falco ...................... B64C 21/10
244/200
(Continued)

FOREIGN PATENT DOCUMENTS

FR 2 947 313 A 12/2010

OTHER PUBLICATIONS

International Search Report for PCT/FR2017/051721 dated Nov. 9, 2017 [PCT/ISA/210].
(Continued)

*Primary Examiner* — Eldon T Brockman
*Assistant Examiner* — Andrew Thanh Bui
(74) *Attorney, Agent, or Firm* — Sughrue Mion, PLLC

(57) ABSTRACT

Part comprising a wall which comprises a first zone (541), a first zone (541) and the second zone (542), a network of riblets being formed on the first zone (541), the second zone (542) and also on the transition zone (54t) so as to reduce the drag of the part when a flow of air flows along said wall; the height, the width and the spacing of the riblets formed on the transition zone (54t) changing along said transition zone (54t) so as to pass from the height, width and spacing of the riblets formed on the first zone at a first end of the transition
(Continued)

zone to the height, width and spacing of the riblets formed on the second zone (542) at a second end of the transition zone (54*t*), the transition zone (54*t*) comprising a central portion on which the riblets comprise on one hand the height and the width that are respectively equal to the height and width of the riblets on the first zone (541), and on the other hand a spacing equal to the spacing of the riblets of the second zone (542).

11 Claims, 7 Drawing Sheets

(51) Int. Cl.
*F04D 29/68* (2006.01)
*F01D 9/04* (2006.01)
*F04D 29/54* (2006.01)
*F01D 25/16* (2006.01)
*F15D 1/12* (2006.01)
*F15D 1/00* (2006.01)

(52) U.S. Cl.
CPC ......... *F01D 25/162* (2013.01); *F04D 29/542* (2013.01); *F04D 29/681* (2013.01); *B64C 2230/26* (2013.01); *F05D 2240/123* (2013.01); *F05D 2240/124* (2013.01); *F05D 2240/126* (2013.01); *F15D 1/004* (2013.01); *F15D 1/12* (2013.01); *Y02T 50/10* (2013.01); *Y02T 50/60* (2013.01)

(58) Field of Classification Search
CPC ......... F05D 2240/123; F05D 2240/124; F05D 2240/126; F15D 1/004; F15D 1/12; Y02T 50/10; Y02T 50/60; F04D 29/542; F04D 29/681

See application file for complete search history.

(56) References Cited

U.S. PATENT DOCUMENTS

| | | | | |
|---|---|---|---|---|
| 8,460,779 B2* | 6/2013 | Gupta | ...................... | F15D 1/004 428/156 |
| 2011/0262705 A1 | 10/2011 | Gupta et al. | | |

OTHER PUBLICATIONS

French Search Report dated Feb. 22, 2017 issued by the Intellectual Property Office of France in application No. 1656025.
International Search Report for PCT/FR2017/051721 dated Nov. 9, 2017.

\* cited by examiner

A-A

B-B

C-C

PART AND METHOD FOR PRODUCING A PART HAVING REDUCED DRAG BY NON-CONSTANT RIBLETS

CROSS REFERENCE TO RELATED APPLICATIONS

This application is a National Stage of International Application No. PCT/FR2017/051721, filed on Jun. 27, 2017, which claims priority from French Patent Application No. 1656025, filed on Jun. 28, 2016, the disclosures of each of which are herein incorporated by reference in their entireties.

FIELD OF THE INVENTION

The present invention relates to a part of a turbomachine for an aircraft which is adapted to reduce drag of said part created by the passage of airflow along said part.

More particularly, the invention relates to a blade of the turbomachine comprising riblets, or else a wall of the turbomachine delimiting a vein of airflow inside said turbomachine which comprises riblets.

PRIOR ART

To reduce the drag of the blades of a rectifier of a secondary flow of a turbomachine for aircraft, it is known to form an array of riblets on the intrados and/or the extrados of the blades of said rectifier of the secondary flow.

The riblets are grooves extending according to the axis of the turbomachine on the intrados and the extrados of the blades, such that said grooves are oriented parallel to the direction of the airflow.

The riblets can have various forms. The riblets can for example have a triangular form, or a square form, according to a cross-section normal to the axis of the turbomachine.

The riblets generally have a height and a width of the order of 1 to 100 µm. Also, two adjacent riblets can be spaced by a distance from 0 to 50 µm.

According to a first known solution, the riblets have a form which is constant along the intrados and the extrados. The form of a riblet also comprises the width and the height of said riblet.

This first known solution offers the advantage of making manufacturing of the riblets on the blades easy.

Due to the form of the profiles of blades, the flow speed of the airflow along the extrados and the intrados of the blades is not constant.

Now, for a given form, reduction of drag by riblets depends on the speed of the flow of the airflow circulating along the wall on which said riblets are formed.

In other words, some forms of riblets effectively reduce the drag when the flow speed of the airflow is low, while other forms of riblets effectively reduce drag when the flow speed of the airflow is high.

In this way, such a first solution does not effectively reduce the drag of the blades.

To consider the variation in speed of the flow of the airflow along the extrados and intrados, a second known solution consists of separating the intrados and/or extrados into at least two zones, a first zone being located near the leading edge of the blade while a second zone is located near the trailing edge, and forming riblets of different forms on the first zone and the second zone. The form of the riblets on the first zone and the second zone is constant.

A transition zone is located between the first and the second zone so as to let the form of the riblets evolve between the form of the riblets on the first zone and the form of the riblets on the second zone.

Such a second solution offers the advantage of being able to adapt the form of the riblets along the wall of the blades according to the flow speed of the airflow.

However, due to the variation in form of the riblets, the second known solution substantially complicates manufacturing of the riblets. Manufacturing is especially made more complex due to the transition zone on which the form of the riblets evolves.

Documents US2011262705 and FR2947313 are also known. However, the solutions described in these documents are unsatisfactory.

In this way, none of the known solutions both reduces effectively drag, and at the same time simplifies the manufacturing method of the riblets.

General Presentation of the Invention

An aim of the invention is to propose a solution both effectively reducing drag created by the circulation of airflow against a wall by locally adapting the form of the riblets formed on said wall to the flow speed of the airflow, and at the same time having a manufacturing method of riblets on said wall which is simple to implement.

For this purpose, a part of a turbomachine for an aircraft is provided comprising a wall which comprises a first zone, a second zone, and a transition zone located between the first zone and the second zone, an array of riblets being formed on the first zone, on the second zone, and also on the transition zone;

the riblets comprising an apex, a height, a width and a spacing which corresponds to the distance between the apices of adjacent riblets;

the height, the width, and the spacing of the riblets formed on the first zone being constant on the first zone;

the height, the width, and the spacing of the riblets formed on the second zone being constant on the second zone;

the height, the width, and the spacing of the riblets formed on the transition zone evolving along said transition zone so as to move from the height, the width, and the spacing of the riblets formed on the first zone at a first end of the transition zone, to the height, the width, and the spacing of the riblets formed on the second zone at a second end of the transition zone;

characterized in that the transition zone comprises a central portion located between the first and the second end on which the riblets comprise both the height and the width which are respectively equal to the height and the width of the riblets of the first zone, and also a spacing equal to the spacing of the riblets of the second zone.

Such a part has a reduced drag due to riblets.

The part according to the invention is advantageously completed by the following characteristics, taken singly or in any of their technically possible combinations:

the ratio between the spacing and the height of the riblets formed on the first zone being equal to the ratio between the spacing and the height of the riblets formed on the second zone;

the part is a blade of a turbomachine for aircraft, the blade comprising an intrados and an extrados, the array of riblets being located on the intrados and/or the extrados of said blade;

the blade comprises a leading edge and a trailing edge, the first zone extending from the leading edge and the second zone extending from the trailing edge, the height, the width and the spacing of the riblets of the second zone being respectively greater than the height, the width and the spacing of the riblets of the first zone;

the blade comprises a radial axis and an axis perpendicular to the radial axis, the riblets formed on the first zone having an angle of inclination relative to the axis perpendicular to the radial axis which is constant on the first zone, the riblets formed on the second zone having an angle of inclination relative to the axis perpendicular to the radial axis which is greater than or equal to the angle of inclination of the riblets of the first zone and which is constant on the second zone, the riblets formed on the transition zone having an angle of inclination relative to the axis perpendicular to the radial axis which evolves along said transition zone between the angle of inclination of the riblets of the first zone at the first end of the transition zone, and the angle of inclination of the riblets of the second zone at the second end of the transition zone;

the angle of inclination of the riblets of the first zone is between 0° and 15°, and the angle of inclination of the riblets of the second zone is between 0° and 30° the part is a rectifier blade for a secondary rectifier of a turbomachine for an aircraft.

The invention also relates to a turbomachine for aircraft comprising a part according to any one of the preceding characteristics.

The invention also relates to a turbomachine for aircraft comprising a part according to the principal characteristic, in which the turbomachine comprises a primary vein, a secondary vein, a fan, and a secondary rectifier located in the secondary vein, the part being a separating spout between the primary vein and the secondary vein which is located between the fan and the secondary rectifier, the riblets being located on a portion of the separating spout forming an internal wall of the secondary vein.

The invention also relates to a method for attenuating drag of a part created by the circulation of airflow along a wall of said part, said method comprising the following steps:

forming an array of riblets on a first zone of the wall, the riblets comprising an apex, a height, a width, and a spacing which corresponds to the distance between the apices of adjacent riblets, the height, the width, and the spacing of the riblets of the first zone being constant on the entire first zone;

forming an array of riblets on a second zone of the wall, the riblets comprising an apex, a height, a width, and a spacing which corresponds to the distance between the apices of adjacent riblets, the height, the width, and the spacing of the riblets of the second zone being constant on the entire second zone, the ratio between the spacing and the height of the riblets of the first zone being equal to the ratio between the spacing and the height of the riblets of the second zone;

forming an array of riblets on a transition zone located between the first zone and the second zone, the riblets comprising an apex, a height, a width, and a spacing corresponding to the distance between the apices of adjacent riblets, the height, the width, and the spacing of the riblets of the transition zone evolving along said transition zone so as to move from the height, the width, and the spacing of the riblets of the first zone at a first end of the transition zone, to the height, the width, and the spacing of the riblets of the second zone at a second end of the transition zone, the transition zone comprising a central portion located between the first and the second end on which the riblets comprise both the height and the width which are respectively equal to the height and the width of the riblets of the first zone, and also a spacing equal to the spacing of the riblets of the second zone.

According to an independent aspect, the invention also relates to a blade of a turbomachine, for example a blade of a secondary rectifier, which comprises an intrados, an extrados, a leading edge, a trailing edge, an apex, a foot, a radial axis and an axis perpendicular to the radial axis, riblets being formed on a first zone, a second zone and a transition zone of the intrados and/or the extrados, the transition zone being located between the first zone and the second zone, the riblets formed on the first zone having an angle of inclination relative to the axis perpendicular to the radial axis which is constant on the first zone, the riblets formed on the second zone having an angle of inclination relative to the axis perpendicular to the radial axis which is greater than the angle of inclination of the riblets of the first zone and which is constant on the second zone, the riblets formed on the transition zone having an angle of inclination relative to the axis perpendicular to the radial axis which evolves along said transition zone between the angle of inclination of the riblets of the first zone at a first end of the transition zone, and the angle of inclination of the riblets of the second zone at a second end of the transition zone.

PRESENTATION OF FIGURES

Other characteristics, aims and advantages of the invention will emerge from the following description of different embodiments illustrated in the following drawings:

FIG. 2b illustrates a sectional view of the rectifier blade illustrated in FIG. 2a;

FIG. 3a illustrates a frontal view of a portion of the extrados of a rectifier blade on which riblets are formed, with only the apices of the riblets being illustrated in FIG. 3a;

DESCRIPTION OF THE INVENTION

Figure 1:
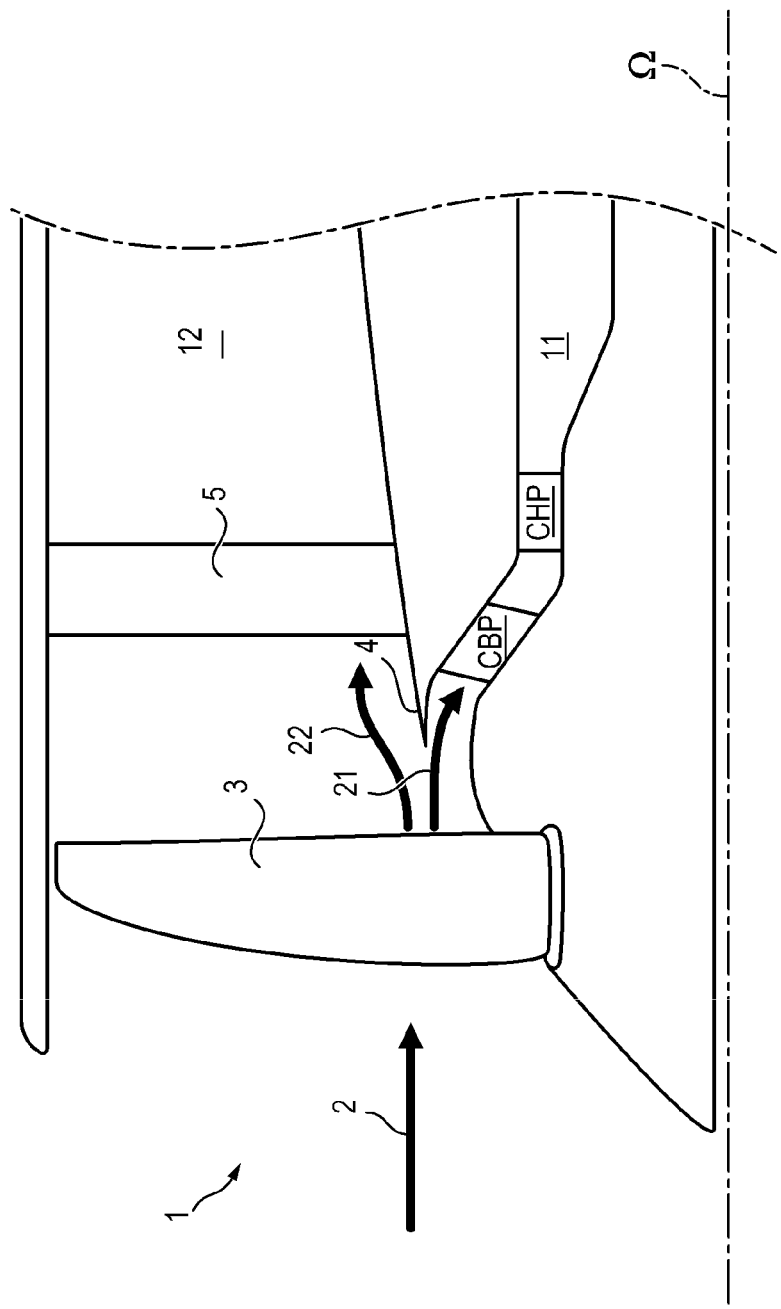
FIG. 1 illustrates a part of a half-view of a turbomachine.

As shown in FIG. 1, a turbofan engine 1 for aircraft presents a principal direction extending according to a longitudinal axis $\Omega$, and creates two airflows separated from an airflow 2 admitted at input of said turbomachine 1.

The airflow 2 admitted at input of the turbomachine 1 is first compressed by a fan 3. Exiting from the fan 3, the airflow 2 is then separated into two separate flows, a first flow forming a primary flow 21 which circulates in a primary vein 11 of the turbomachine 1, and a second flow forming a secondary flow 22 which circulates in a secondary vein 12 of said turbomachine 1.

The separation of the primary flow 21 and of the secondary flow 22 is ensured by a separating spout 4 which is arranged downstream of the fan 3. The separating spout 4 comprises a first face forming an internal wall of the primary vein, and a second face forming an internal wall of the secondary vein.

Hereinbelow, the primary flow 21 is compressed by a low-pressure compressor CBP and a high-pressure compressor CHP, then is burnt with fuel in a combustion chamber.

The secondary flow 22 is per se directed to a secondary rectifier 5 located in the secondary vein 12 so as to rectify said secondary flow 22 relative to the axis Ω of the turbomachine 1 and compress said secondary flow 22.

Figure 2A:
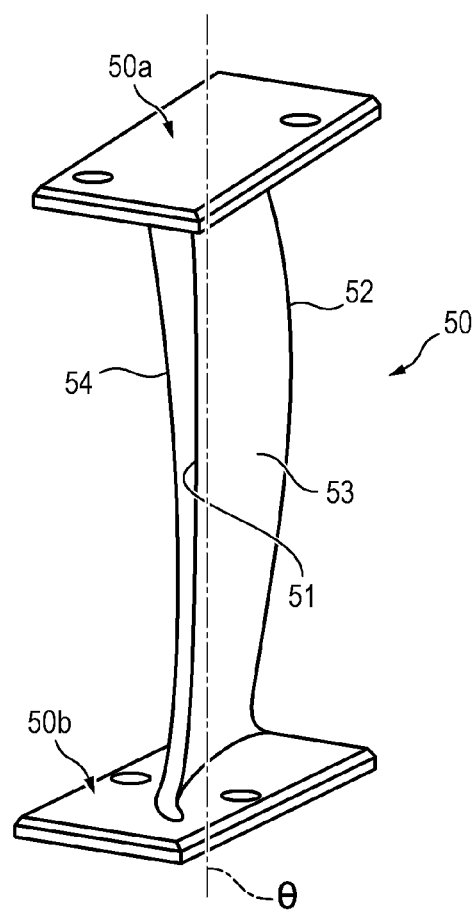
FIG. 2a illustrates a perspective view of a rectifier blade.
Figure 2B:
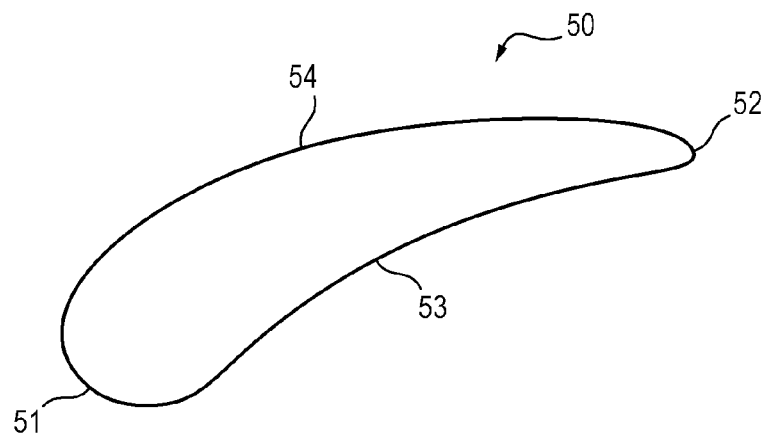

As represented in FIGS. 2a and 2b, the secondary rectifier 5 is a disc formed of a plurality of rectifier blades 50 which is centred on the axis Ω of the turbomachine 1.

Each rectifier blade 50 comprises a leading edge 51 by which the secondary flow 22 comes into contact with the rectifier blade 50 during operation of the turbomachine 1, and a trailing edge 52 by which the secondary airflow 22 is exhausted from the rectifier blade 50.

The rectifier blade 50 comprises an intrados 53 and an extrados 54 which each form a wall extending between the leading edge 51 and the trailing edge 52 of the rectifier blade 50.

The rectifier blade 50 also comprises an apex 50a and a foot 50b. The apex 50a forms the end of the blade 50 which is located radially to the outside relative to the axis Ω when said blade 50 is mounted in the turbomachine 1. The foot 50b forms the end of the blade 50 which is located radially to the inside relative to the axis Ω when said blade 50 is mounted in the turbomachine 1. The apex 50a is flat and is parallel to the axis Ω of the turbomachine.

The rectifier blade 50 further comprises a radial axis θ which is perpendicular to the axis Ω of the turbomachine 1 and to the axis of the rectifier (which is combined with the axis Ω of the turbomachine 1). The radial axis forms a principal axis of elongation of the rectifier blade 50 and connects the apex 50a to the foot 50b.

During operation of the turbomachine 1, the secondary flow 22 comes into contact with the rectifier blade 50 via the leading edge 51. The secondary flow 22 circumvents the rectifier blade 50 by dividing into two, a part of the secondary flow 22 bordering the intrados 53, another part of the secondary flow 22 bordering the extrados 54. These two parts of the flow then join up at the trailing edge 52 of the rectifier blade 50 where the secondary flow 22 is expelled from the rectifier blade 50.

As represented in FIGS. 3a, 3b, 3c and 3d, an array of riblets 6 is formed on the extrados 54 of said rectifier blade 50 so as to limit drag created by circulation of the secondary flow 22 along the extrados 54 of the rectifier blade 50.

The riblets 6 are grooves which are directed parallel to the direction of flow of the secondary airflow 22, and which are therefore directed according to a direction comprising a component according to the axis Ω of the turbomachine 1. The riblets 6 can be parallel to the axis Ω.

The riblets 6 comprise an apex S forming an upper end and a base B forming a lower end.

Each riblet 6 comprises a height corresponding to the distance between the base B and the apex S of the riblet 6, and a width corresponding to the width of the base B.

The riblets 6 are spaced apart according to a spacing corresponding to the distance between the apex S of a riblet 6 and the apices S of the adjacent riblets 6.

The extrados 54 comprises three zones each comprising an array of riblets 6 of different forms. The extrados 54 comprises a first zone 541 which extends from the leading edge 51 and a second zone 542 which extends from the trailing edge 52. The first zone 541 and the second zone 542 are separated by a transition zone 54t located between said first and second zones 541 and 542. The transition zone 54t preferably has a length which is not greater than 5% of the length of the cord of the blade 50. Also, the boundary between the first zone 541 and the transition zone 54t is preferably located between 10% and 40% of the cord of the blade 50 starting from the leading edge 51, and the boundary between the second zone 542 and the transition zone 54t is preferably located between 15% and 45% of the cord starting from the leading edge 51.

The cord of a blade corresponds to a theoretical line linking the leading edge to the trailing edge.

Figure 3A:
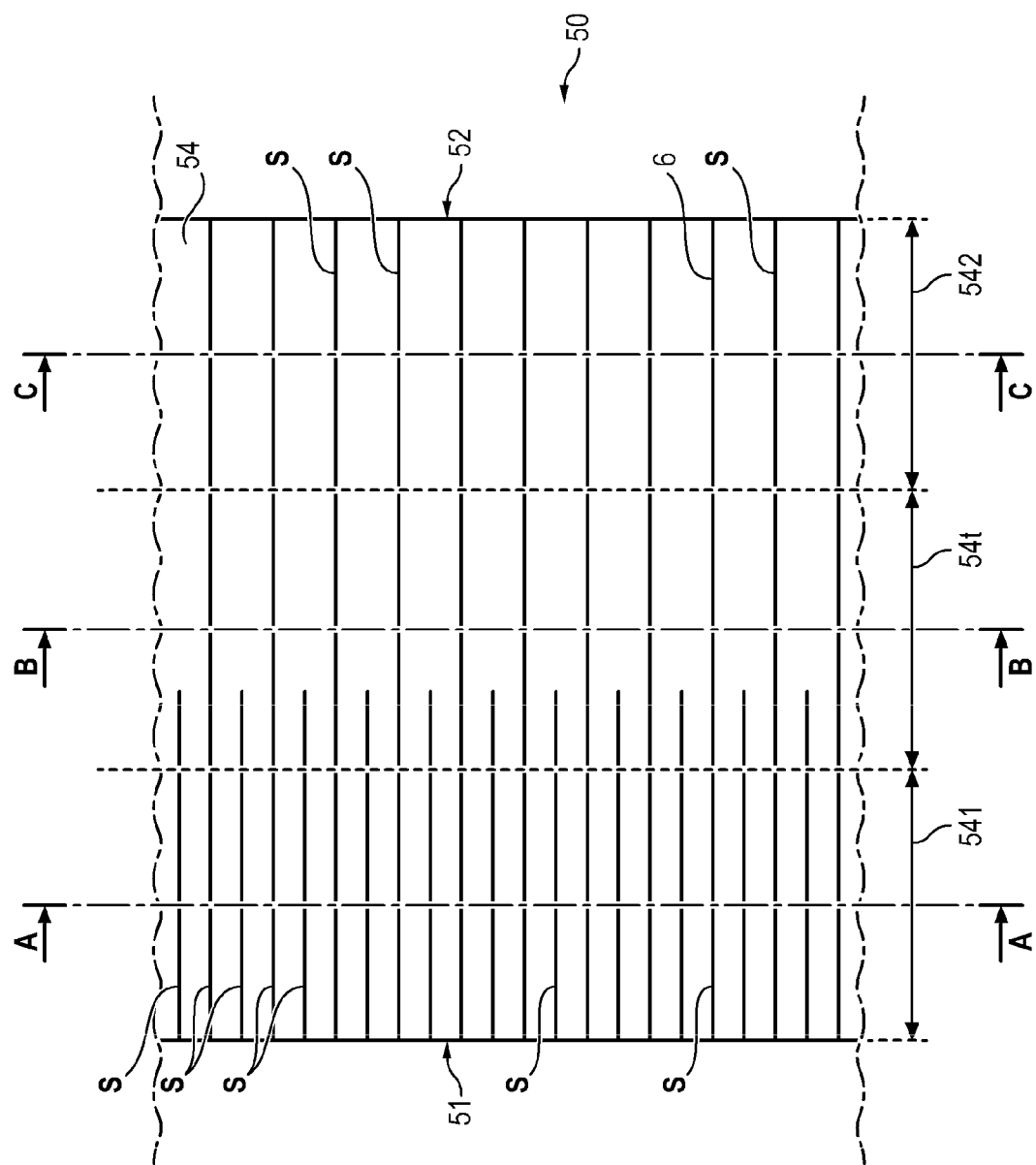
Figure 3B:
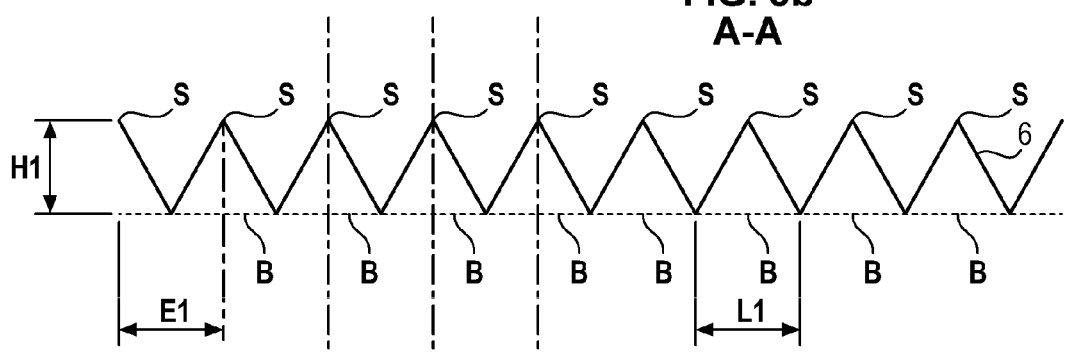
FIG. 3b illustrates a sectional view of the FIG. 3a according to the axis A-A located in the region of a first zone of the extrados.

As illustrated in FIG. 3a and FIG. 3b, the first zone 541 located in the region of the leading edge 51 comprises riblets 6 which have a height H1, a spacing E1, and a width L1. The spacing E1 of the riblets 6 of the first zone 541 is equal to the width L1, such that the bases B of the adjacent riblets 6 are in contact.

The form of the riblets 6 (their height H1, their spacing E1, and their width L1) is constant all along the first zone 541 of the extrados 54.

Figure 3C:
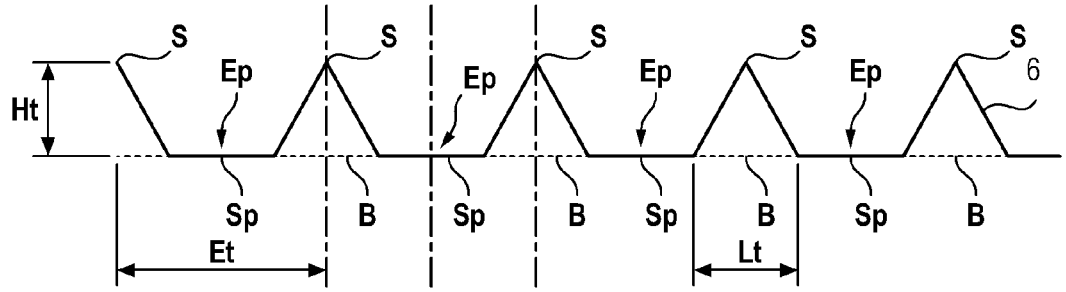
FIG. 3c illustrates a sectional view of the FIG. 3a according to the axis B-B located in the region of a transition zone of the extrados.
Figure 3D:
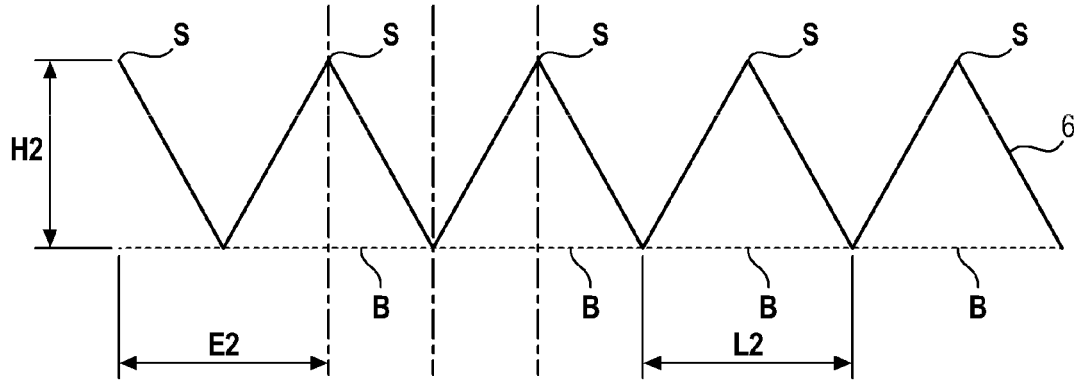
FIG. 3d illustrates a sectional view of the FIG. 3a according to the axis C-C located in the region of the second zone.

As illustrated in FIG. 3a and the FIG. 3d, the second zone 542 located in the region of the trailing edge 52 comprises riblets 6 which have a height H2, a spacing E2, and a width L2. The spacing E2 of the riblets 6 of the second zone 542 is equal to the width L2, such that the bases B of the adjacent riblets 6 are in contact.

The form of the riblets 6 (their height H2, their spacing E2, and their width L2) is constant all along the second zone 542 of the extrados 54.

Figure 4:
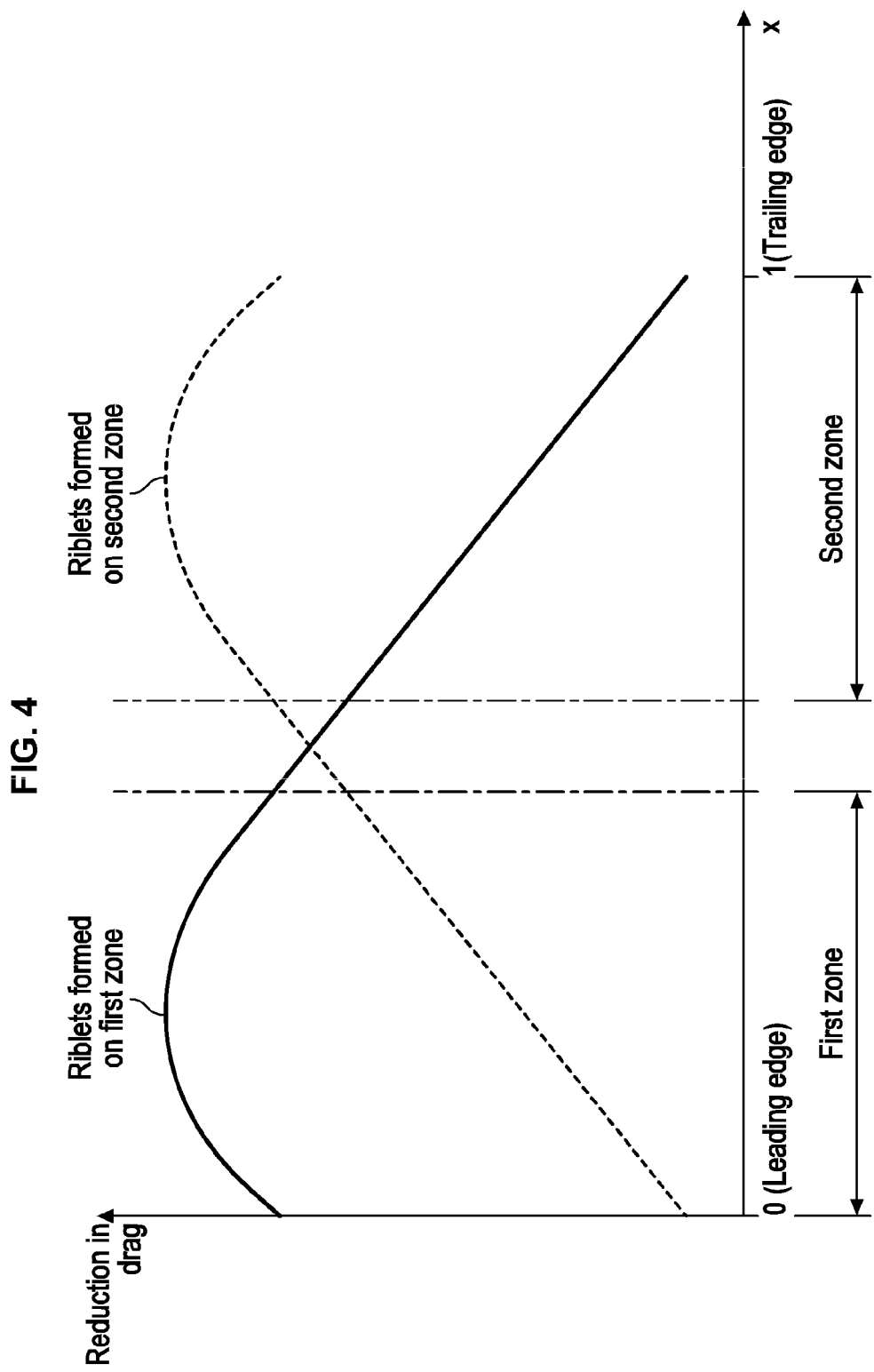
FIG. 4 illustrates a diagram illustrating the adaptation of the form of the riblets on the first zone and the second zone so as to optimise the reduction in drag along the extrados of the blade.

As illustrated in FIG. 4, the form of the riblets 6 (their height, their spacing, and their width) formed on the first zone 541 and the second zone 542 of the extrados 54 is adapted as a function of the variation in flow speed of the secondary airflow 22 along the extrados 54 so as to limit to a maximum drag created by the flow of the secondary airflow 22.

For this to occur, both the form of the riblets 6 formed on the first zone 541 is adapted to obtain a maximum of reduction of drag for a flow speed of the secondary airflow 22 corresponding to the average speed of the secondary airflow 22 along the first zone 541, and also the form of the riblets 6 formed on the second zone 542 is adapted to obtain a maximum of reduction of drag for a flow speed of the secondary airflow 22 corresponding to the average speed of the secondary airflow 22 along the second zone 542.

FIG. 4 illustrates the reduction of drag obtained by the riblets 6 along the extrados 54 of the blade 50, x being the curvilinear abscissa of the extrados 54, with x equal to 0 at the leading edge 51 and x is equal to 1 at the trailing edge 52.

The flow speed of the secondary airflow 22 in the region of the trailing edge 52 being greater than the flow speed of said secondary airflow 22 in the region of the leading edge 51, the height H2 and the spacing E2 of the riblets 6 formed on the second zone 542 are respectively greater than the height H1 and the spacing E1 of the riblets 6 formed on the first zone 541.

To ensure better reduction of drag all along the extrados 54, the ratio E1/H1 is equal to the ratio E2/H2.

Also, the height H2 of the riblets 6 formed on the second zone 542 is preferably equal to twice the height H1 of the riblets 6 formed on the first zone 541, and the spacing E2 of the riblets 6 formed on the second zone 542 is equal to twice the spacing E1 of the riblets 6 formed on the first zone 541. In fact, for a rectifier blade 50 of a secondary rectifier 5, the ratio optimum between the spacing of the riblets 6 formed in the region of the trailing edge 52 and the spacing of the riblets 6 formed in the region of the leading edge 51 is a ratio of 2.

As illustrated in FIG. 3a and FIG. 3c, the transition zone 54t located between the first zone 541 and the second zone 542 comprises riblets 6 which have a height Ht, a spacing Et, and a width Lt.

The form of the riblets 6 (the height Ht, the spacing Et, and the width Lt) on the transition zone 54t evolves along said transition zone 54t so as to move from the height H1, the spacing E1, and the width L1 at a first end of the transition zone located in the region of the first zone 541, to the height H2, the spacing E2, and the width L2 at the second end of the transition zone 54t located in the region of the second zone 542.

Such a transition zone 54t between the first zone 541 and the second zone 542 avoids a phenomenon of over-friction by limiting perturbations in the limit layer of the secondary flow 22 along said transition zone 54t.

Also, the transition zone 54t comprises a central portion located between its first and its second end on which the riblets 6 comprise both a height Ht and a width Lt which are respectively equal to the height H1 and the width L1 of the riblets 6 of the first zone 541, and also a spacing Et which is equal to the spacing E2 of the riblets 6 of the second zone 542.

In this way, on the central portion of the transition zone 54t the adjacent riblets 6 are discarded such that there is a space Ep between the bases B of said adjacent riblets 6. In fact, with the width Lt of the riblets 6 being less than the spacing Et, the adjacent riblets 6 are spaced, or in other words are not in contact. This space Ep allows there to be a flat surface Sp between the adjacent riblets 6.

Such a space Ep between the adjacent riblets 6 on the central portion of the transition zone 54t makes for easier manufacturing of the riblets 6 on the extrados 54. In fact, such a space Ep makes for easier transition in the form of the riblets 6 by allowing an easier change of tool for example.

Also, such a transition zone 54t having such riblets 6 retains a spacing/height ratio which is identical for the first zone 541 and the second zone 542.

The array of riblets 6 can be formed on any part of the turbomachine 1 which has a wall along which air flows so as to reduce drag of said part. The part can form for example the secondary vein or the primary vein of the turbomachine 1.

The riblets 6 can be made according to two possible manufacturing method variants.

According to a first variant, the riblets 6 are formed during moulding of the blade 50. For this to occur, the mould wherein the blade 50 is moulded comprises a fluted internal wall forming an imprint in negative of the riblets 6 to be formed on said blade 50.

To form this imprint of the riblets on the internal wall of the mould, said wall of the mould can be machined. The space Ep between the riblets 6 (which is also present on the imprint in negative of the riblets 6 on the internal wall of the mould) makes for easier machining of the internal wall of the mould by making a change of tool easier, a first tool being used to form the imprint of the riblets of the first zone 541 and the imprint of the riblets 6 of the transition zone 54t, and a second tool larger than the first tool being used to form the imprint of the riblets 6 of the second zone 542 by being aligned on the imprint of the riblets 6 formed on the transition zone 54t. To form the imprint of the riblets 6 of the transition zone 54t, the first tool conducts scanning transversal to the direction of advancement of said first tool, the amplitude of the scanning changing along the transition zone so as to have the form of the riblets 6 of the transition zone 54t vary.

According to a second variant, the riblets 6 are formed by depositing a fluted film of polymer material on the blade 50. The grooves of the film which correspond to the riblets 6 are formed by calandering of said film. To form the riblets 6 on the film, one of the cylinders used for calandering is fluted so as to comprise the imprint in negative of said riblets 6. The grooves of the cylinder can be formed by machining of said cylinder. Here too, the space Ep between the adjacent riblets 6 similarly makes for easier machining of the imprint of the riblets 6 on the cylinder.

In the presented embodiment, only the extrados 54 comprises an array of riblets 6 separated into a first zone 541, a second zone 542, and a transition zone 54t.

However, it is possible that an array of riblets 6 separated into a first zone, a second zone, and a transition zone is formed solely on the intrados 53 of the blade 50. However, the formation of riblets 6 on the extrados 54 has more impact on the reduction of drag than the formation of riblets 6 on the intrados 53.

It is also possible that at the same time the extrados 54 and the intrados 53 comprise an array of riblets 6 separated into a first zone, a second zone and a transition zone.

Further, in the embodiment presented previously, the wall of the blade 50 on which the riblets 6 are formed comprises two zones on which the riblets 6 have a constant form and a transition zone on which the riblets have an evolutive form.

It is however possible to increase the number of zones on which the riblets 6 have a constant form so as to best adapt the form of the riblets 6 to the flow speed of the airflow. To do this, it is necessary to have one transition zone only on which the form of the riblets 6 evolves between each zone on which the form of the riblets 6 is constant. Also, the spacing/height ratio of the riblets 6 formed on the zones on which the form of the riblets is constant must be equal for each of said zones on which the form of the riblets is constant.

Also, in the embodiment presented previously, the part on which the riblets 6 are formed is a rectifier blade 50.

However, it is possible to form riblets 6 such as described previously (at least two zones on which the form of the riblets 6 is constant, and at least one transition zone on which the form of the riblets 6 evolves from the form of the riblets 6 of the first zone to the form of the riblets 6 of the second zone) on other parts of the turbomachine 1 located in the secondary vein 12.

In this way, it is possible to form riblets 6 such as described previously on the separating spout 4 between the primary vein 11 and the secondary vein 12. More precisely, the riblets 6 are formed on the face of the separating spout 4 forming an internal wall of the secondary vein 12.

The riblets 6 illustrated in FIGS. 3b, 3c and 3d comprise a triangular cross-section of form. However, other forms of riblets 6 are possible. The riblets 6 can for example have a cross-section of square or trapezoid form.

Figure 5:
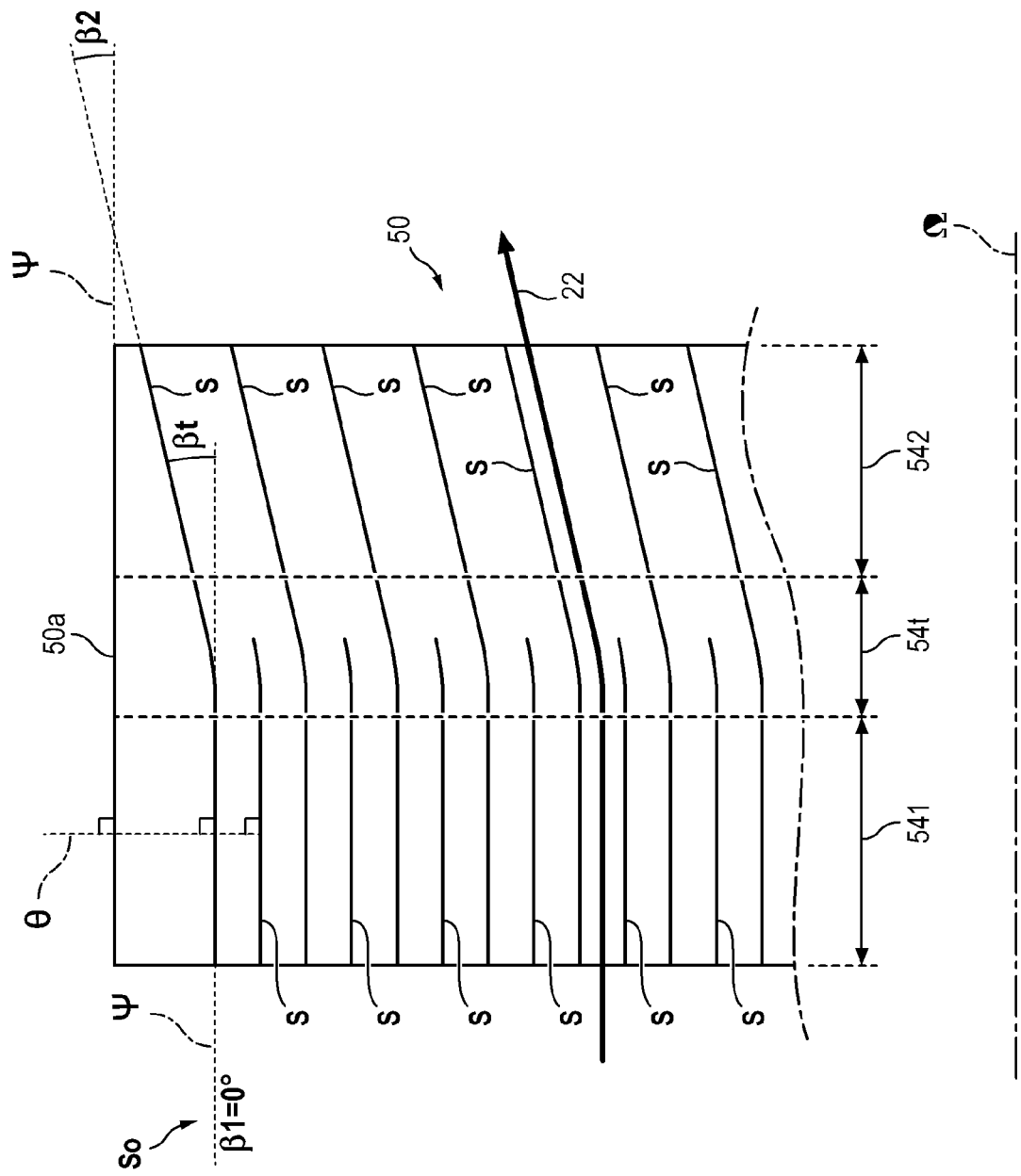
FIG. 5 illustrates a frontal view of the upper part of the extrados of the blade according to a variant in which the inclination of the riblets varies along said extrados, with only the apices of the riblets being illustrated in FIG. 5.

Finally, as illustrated in FIG. 5, the inclination relative to the apex 50a of the blade 50 of the riblets 6 along the extrados 54 and/or of the intrados 53 can vary. More precisely, the inclination of the riblets 6 on the first zone 541 and the second zone 542 is different and constant on the first and second zones 541, 542. The inclination of the riblets 6 evolves along the transition zone 54t between both the inclination of the riblets 6 of the first zone 541 and also the inclination of the riblets 6 of the second zone 542.

This variation in inclination of the riblets 6 relative to the apex 50a also causes a variation in inclination of the riblets 6 relative to the axis Ω of the turbomachine 1.

In fact, in the embodiment presented in FIGS. 3a-3d, the riblets 6 are parallel to the apex 50a and to the axis Ω of the turbomachine 1 all along the extrados 54.

Now, in the variant illustrated in FIG. 5, the riblets 6 formed on the first zone 541 are inclined according to an angle of inclination β1 relative to an axis Ψ which is an axis perpendicular to the radial axis Ω of the blade 50. The axis Ψ is parallel to the apex 50a and to the axis Ω.

The riblets 6 formed on the second zone 542 are inclined according to an angle of inclination β2 relative to the axis Ψ which is an axis perpendicular to the radial axis Ω of the blade 50. The angle of inclination β1 is less than or equal to the angle of inclination β2. The angle of inclination β1 is constant along the first zone 541, and the angle of inclination β2 is constant along the second zone 542. Preferably, when the secondary airflow 22 tends to rise to the apex 50a of the blade 50 during its circulation along said blade 50, the angle of inclination β1 is strictly less than the angle of inclination β2.

The riblets formed on the transition zone 54t have as such an angle of inclination βt relative to the axis Ψ which evolves along said transition zone 54t. The angle of inclination βt evolves from the angle of inclination β1 at the first end of the transition zone 54t, to the angle of inclination β2 at the second end of the transition zone 54t.

This inclination of the riblets 6, and this variation in inclination in some possible variants adapts the orientation of the riblets 6 to the evolution of the direction of flow of the secondary airflow 22 along the blade 50, so as to optimise the reduction of the drag.

In fact, the reduction of the drag by the riblets 6 is optimal when said riblets 6 are parallel to the direction of flow of the secondary airflow 22. Now, the secondary airflow 22 can tend to rise to the apex 50a of the blade 50 during its circulation along said blade 50.

According to a possible variant, the angle of inclination β1 of the riblets 6 formed on the first zone 541 is between 0° (as shown in FIG. 5) and 15°, and the angle of inclination β2 of the riblets 6 formed on the second zone 542 is between 0° and 30°.

Figure 6:
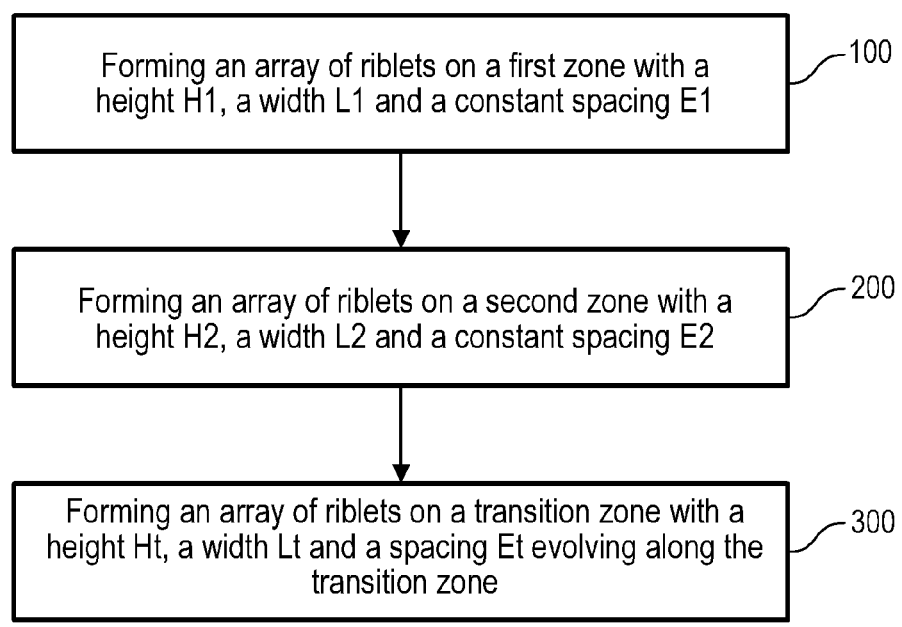
FIG. 6 illustrates a possible execution of a method for attenuating the drag of a part according to the invention.

Also, as shown in FIG. 6, according to a possible execution of a manufacturing method of a part for turbomachine whereof the drag created by the circulation of airflow along a wall of said part is reduced, said method comprises the following steps:

100: forming an array of riblets 6 on a first zone 541 of the wall (for example the extrados 54 of a blade 50), the riblets 6 comprising an apex S, a height H1, a width L1, and a spacing E1 which corresponds to the distance between the apices S of adjacent riblets 6, the height H1, the width L1, and the spacing E1 of the riblets 6 of the first zone 541 being constant on the entire first zone 541.

200: forming an array of riblets 6 on a second zone 542 of the wall, the riblets 6 comprising an apex S, a height H2, a width L2, a spacing E2 corresponding to the distance between the apices S of adjacent riblets 6, the height H2, the width L2, and the spacing E2 of the riblets 6 of the second zone 542 being constant on the entire second zone 542. The ratio E1/H1 between the spacing E1 and the height H1 of the riblets 6 of the first zone 541 is equal to the ratio E2/H2 between the spacing E2 and the height H2 of the riblets 6 of the second zone 542 to improve reduction in drag.

300: forming an array of riblets 6 on a transition zone 54t located between the first zone 541 and the second zone 542, the riblets 6 comprising an apex S, a height Ht, a width Lt, and a spacing Et corresponding to the distance between the apices S of adjacent riblets 6, the height Ht, the width Lt, and the spacing Et of the riblets 6 of the transition zone 54t evolving along said transition zone 54t so as to move from the height H1, the width L1, and the spacing E1 of the riblets 6 of the first zone 541 at a first end of the transition zone 54t, to the height H2, the width L2, and the spacing E2 of the riblets 6 of the second zone 542 at a second end of the transition zone 54t. The transition zone 54t comprises a central portion located between the first and the second end on which the riblets 6 comprise both the height Ht and the width Lt which are respectively equal to the height H1 and the width L1 of the riblets 6 of the first zone 541, and also a spacing Et equal to the spacing E2 of the riblets 6 of the second zone 542.

These three steps of formation of riblets 100, 200 and 300 can be conducted in any order. However, the formation step 300 of the riblets 6 on the transition zone 54t is preferably conducted second, that is, after the formation step 100 of the riblets 6 on the first zone 541, or else after the formation step 200 of the riblets 6 on the second zone 542. It is therefore possible for example to form the riblets 6 on the first zone 541, then on the transition zone 54t, then on the second zone 542. Another possible example consists of forming the riblets 6 on the second zone 542, then on the transition zone 54t, then on the first zone 541.

Also, as described previously, these three formation steps of riblets 100, 200 and 300 can be conducted simultaneously by depositing a film of fluted polymer material on the part, or else by moulding the part in a mould comprising a fluted internal surface.

The invention claimed is:

1. A turbomachine part (1) for an aircraft comprising a wall which comprises a first zone (541), a second zone (542), and a transition zone (54t) located between the first zone (541) and the second zone (542), an array of riblets (6) being formed on the first zone (541), on the second zone (542), and also on the transition zone (54t), the riblets being oriented parallel to the principal direction of airflow;

the riblets (6) comprising an apex (S), a height (H1, H2, Ht), a width (L1, L2, Lt), and a spacing (E1, E2, Et) which corresponds to the distance between the apices (S) of adjacent riblets (6);

the height (H1), the width (L1), and the spacing (E1) of the riblets (6) of the first zone (541) being constant on the first zone (541);

the height (H2), the width (L2), and the spacing (E2) of the riblets (6) of the second zone (542) being constant on the second zone (542);

the height (Ht), the width (Lt), and the spacing (Et) of the riblets (6) of the transition zone (54t) evolving along said transition zone (54t) so as to move from the height (H1), the width (L1), and the spacing (E1) of the riblets (6) formed on the first zone (541) at a first end of the transition zone (54t), to the height (H2), the width (L2), and the spacing (E2) of the riblets (6) formed on the second zone (542) at a second end of the transition zone (54t);

characterized in that the transition zone (54t) comprises a central portion located between the first and the second end on which the riblets (6) comprise both the height (Ht) and the width (Lt) which are respectively equal to the height (H1) and the width (L1) of the riblets (6) of the first zone (541), and also a spacing (Et) equal to the spacing (E2) of the riblets (6) of the second zone (542).

2. The part according to claim 1, wherein the ratio (E1/H1) between the spacing (E1) and the height (H1) of the riblets (6) of the first zone (541) being equal to the ratio (E2/H2) between the spacing (E2) and the height (H2) of the riblets (6) of the second zone (542).

3. The part according to claim 1, wherein the part is a blade (50) of a turbomachine for aircraft, the blade (50) comprising an intrados (53) and an extrados (54), the array of riblets (6) being located on the intrados (53) and/or the extrados (54) of said blade (50).

4. The part according to claim 3, wherein the blade (50) comprises a leading edge (51) and a trailing edge (52), the first zone (541) extending from the leading edge (51) and the second zone (542) extending from the trailing edge (52), the height (H2), the width (L2) and the spacing (E2) of the riblets (6) of the second zone (542) being respectively greater than the height (H1), the width (L1) and the spacing (E1) of the riblets (6) of the first zone (541).

5. The part according to claim 4, wherein the blade (50) comprises a radial axis (θ) and an axis (Ω) perpendicular to the radial axis (θ), the riblets (6) formed on the first zone (541) having an angle of inclination (β1) relative to the axis (Ω) which is constant on the first zone (541), the riblets (6) formed on the second zone (542) having an angle of inclination (β2) relative to the axis (Ω) which is greater than or equal to the angle of inclination (β1) of the riblets (6) of the first zone (541) and which is constant on the second zone (542), the riblets (6) formed on the transition zone (54t) having an angle of inclination (βt) relative to the axis (Ω) which evolves along said transition zone (54t) between the angle of inclination (β1) of the riblets (6) of the first zone (541) at the first end of the transition zone (54t), and the angle of inclination (β2) of the riblets (6) of the second zone (542) at the second end of the transition zone (54t).

6. The part according to claim 5, wherein the angle of inclination (β1) of the riblets (6) of the first zone (541) is between 0° and 15°, and wherein the angle of inclination (β2) of the riblets (6) of the second zone (542) is between 0° and 30°.

7. The part according to claim 3, wherein said part is a rectifier blade for a secondary rectifier (5) of a turbomachine (1) for an aircraft.

8. A turbomachine (1) for aircraft comprising a part according to claim 1.

9. A turbomachine (1) for aircraft comprising a primary vein (11), a secondary vein (12), a fan (3), and a secondary rectifier (5) located in the secondary vein (12), a separating spout (4) between the primary vein (11) and the secondary vein (12) which is located between the fan (3) and the secondary rectifier (5), the separating spout (4) forming a part according to claim 1, the riblets (6) being located on a portion of the separating spout (4) forming an internal wall of the secondary vein (12).

10. A manufacturing method of a turbomachine part (1), said method comprising the following steps:
   (100) forming an array of riblets (6) on a first zone (541) of a wall of the part, the riblets (6) comprising an apex (S), a height (H1), a width (L1), and a spacing (E1) which corresponds to the distance between the apices (S) of adjacent riblets (6), the height (H1), the width (L1), and the spacing (E1) of the riblets (6) of the first zone (541) being constant on the entire first zone (541);
   (200) forming an array of riblets (6) on a second zone (542) of the wall, the riblets (6) comprising an apex (S), a height (H2), a width (L2), a spacing (E2) corresponding to the distance between the apices (S) of adjacent riblets (6), the height (H2), the width (L2), and the spacing (E2) of the riblets (6) of the second zone (542) being constant on the entire second zone (542);
   (300) forming an array of riblets (6) on a transition zone (54t) of the wall located between the first zone (541) and the second zone (542), the riblets (6) comprising an apex (S), a height (Ht), a width (Lt), and a spacing (Et) corresponding to the distance between the apices (S) of adjacent riblets (6), the height (Ht), the width (Lt), and the spacing (Et) of the riblets (6) of the transition zone (54t) evolving along said transition zone (54t) so as to move from the height (H1), the width (L1), and the spacing (E1) of the riblets (6) of the first zone (541) at a first end of the transition zone (54t), to the height (H2), the width (L2), and the spacing (E2) of the riblets (6) of the second zone (542) at a second end of the transition zone (54t), the transition zone (54t) comprising a central portion located between the first and the second end on which the riblets (6) comprise both the height (Ht) and the width (Lt) which are respectively equal to the height (H1) and the width (L1) of the riblets (6) of the first zone (541), and also a spacing (Et) equal to the spacing (E2) of the riblets (6) of the second zone (542).

11. The method according to claim 10 wherein the ratio (E1/H1) between the spacing (E1) and the height (H1) of the riblets (6) of the first zone (541) is equal to the ratio (E2/H2) between the spacing (E2) and the height (H2) of the riblets (6) of the second zone (542).

* * * * *